United States Patent [19]

Vercaemer et al.

[11] Patent Number: 4,842,068
[45] Date of Patent: Jun. 27, 1989

[54] PROCESS FOR SELECTIVELY TREATING A SUBTERRANEAN FORMATION USING COILED TUBING WITHOUT AFFECTING OR BEING AFFECTED BY THE TWO ADJACENT ZONES

[75] Inventors: Claude Vercaemer, St Etienne; R. Lemanczyk, St Galmier; Bernard Piot, St Priest En Jarez, all of France

[73] Assignee: Dowell Schlumberger Incorporated, Tulsa, Okla.

[21] Appl. No.: 135,215

[22] Filed: Dec. 21, 1987

[30] Foreign Application Priority Data

Dec. 31, 1986 [FR] France ............................. 86 18488
Feb. 4, 1987 [FR] France ............................. 87 01345

[51] Int. Cl.$^4$ .................................................. E21B 43/25
[52] U.S. Cl. ...................................... 166/269; 166/274; 166/305.1
[58] Field of Search .................... 166/305.1, 269, 313, 166/306, 285, 191, 274

[56] References Cited

U.S. PATENT DOCUMENTS

| 2,889,880 | 6/1959 | Hughes | 166/313 |
| 2,991,833 | 9/1961 | Brown et al. | 166/191 |
| 3,055,423 | 9/1962 | Parker | 166/306 |
| 3,103,813 | 9/1963 | Bourne, Jr. et al. | 166/313 |
| 3,132,694 | 5/1964 | McGlasson et al. | 166/305.1 |
| 3,145,773 | 8/1964 | Jorda et al. | 166/295 |

Primary Examiner—Jerome W. Massie
Assistant Examiner—Terry Lee Melius
Attorney, Agent, or Firm—S. A. Littlefield

[57] ABSTRACT

The invention consists of a new process for selectively treating a subterranean formation without affecting or being effected by the two adjacent zones (above and below).

Using the invented process, the treatment fluid is injected into the formation to be treated F, at the same time as two protection fluids, whether the same or different, are injected into the two adjacent zones (above [ZS] and below [ZI]).

The process can be applied even in the presence of fractures, gravel-pack and their zones.

11 Claims, 9 Drawing Sheets

PROCESS FOR SELECTIVELY TREATING A SUBTERRANEAN FORMATION USING COILED TUBING WITHOUT AFFECTING OR BEING AFFECTED BY THE TWO ADJACENT ZONES

This application concerns a process for selectively treating a subterranean formation without affecting or being affected by the two adjacent subterranean formations above and below it, termed here adjacent zones (above and below).

When operating oil, gas, geothermal and analogous fields, it is often necessary to use treatments, termed matrix stimulation treatments, which consist in injecting a treatment fluid into a specified formation. The fluid may be, for example, an acidic fluid the purpose of which is to endow the formation with its original structure, the structure having been altered during drilling due particularly to certain debris being dissolved, or a plugging fluid intended to plug a formation or reduce its permeability if it is likely to become an area through which fluids can pass easily.

The current state of the art regarding selective treatment of a geological formation consists in injecting the treatment fluid into the formation using a casing or coiled tubing while isolating the treatment zone by sealing it using various types of mechanical plug, termed "packers", particularly those comprising two sections, one upper and one lower, and termed "straddle packers". This vertical treatment fluid limiting method has a sealing effect within the formation, to a certain distance from the well which is all the greater, the higher the ratio of permeability in the horizontal direction to permeability in the vertical direction.

These techniques do have drawbacks, particularly that of mediocrity of treatment fluid positioning selectability within the formation in areas far away from the well; also, as is known to those skilled in the art, combatting water coning is very difficult in productive zones.

The invention presented here has the aim of providing a remedy to these drawbacks. The invention consists in a new process for selectively treating a subterranean formation without affecting or being affected by the two adjacent zones above and below, and is characterised in that the treatment fluid is injected into the formation to be treated at the same time as two protection fluids, whether the same or different, are injected into the two adjacent zones (above and below).

Definition: "affect": any possible interference between the natural or injected fluids contained in the three relevant formations (dispersal, diversion, water invasion, etc.).

Protection fluids comprising a major proportion of water or heavy hydrocarbons such as gas oil, diesel oil or kerosene can be particularly appreciated.

It is advantageous for the treatment fluid not to be miscible with the protection fluids, which are preferably identical.

It is advantageous when using the process to use a device with a line termed a "bypass" line linking the adjacent zones (above and below) within the casing and making the injection of protection fluid into these possible.

It is advantageous using the process to inject (i) the treatment fluid through coiled tubing, which has an output opening at the level of the formation to be treated and is positioned within the casing, and (ii), the protection fluid(s) into the casing itself.

The invention is described in the more limited aspects of a preferred embodiment thereof and in conjunction with the accompanying drawings forming a part of this specification and in which.

In accordance with the preferred construction method for the invention, the bypass line consists of at least one tube attached along the coiled tubing, being at least as high as the zone to be treated and at the same level.

In accordance with a second preferred construction method for the invention, a two-piece packer (with upper and lower sections) isolates, inside the casing, the formation to be treated, sealing it off from the two adjacent zones; the bypass line consists of a pipe incorporated in the packer, linking its two parts.

Other mechanical construction methods are possible. It can easily be understood that, whichever solution is used, the bypass line upper opening must be situated slightly above the upper boundary of the zone to be treated, and its lower opening slightly below the lower boundary of the same zone.

Variations on this are: a bypass line concentric with the coiled tubing (the protection fluid passing through the annular space so formed), or one or several elements of circular or kidney-shaped cross-section arranged on the circumference of the coiled tubing, or analogous rigid, flexible or semi-flexible devices.

Figure 1:
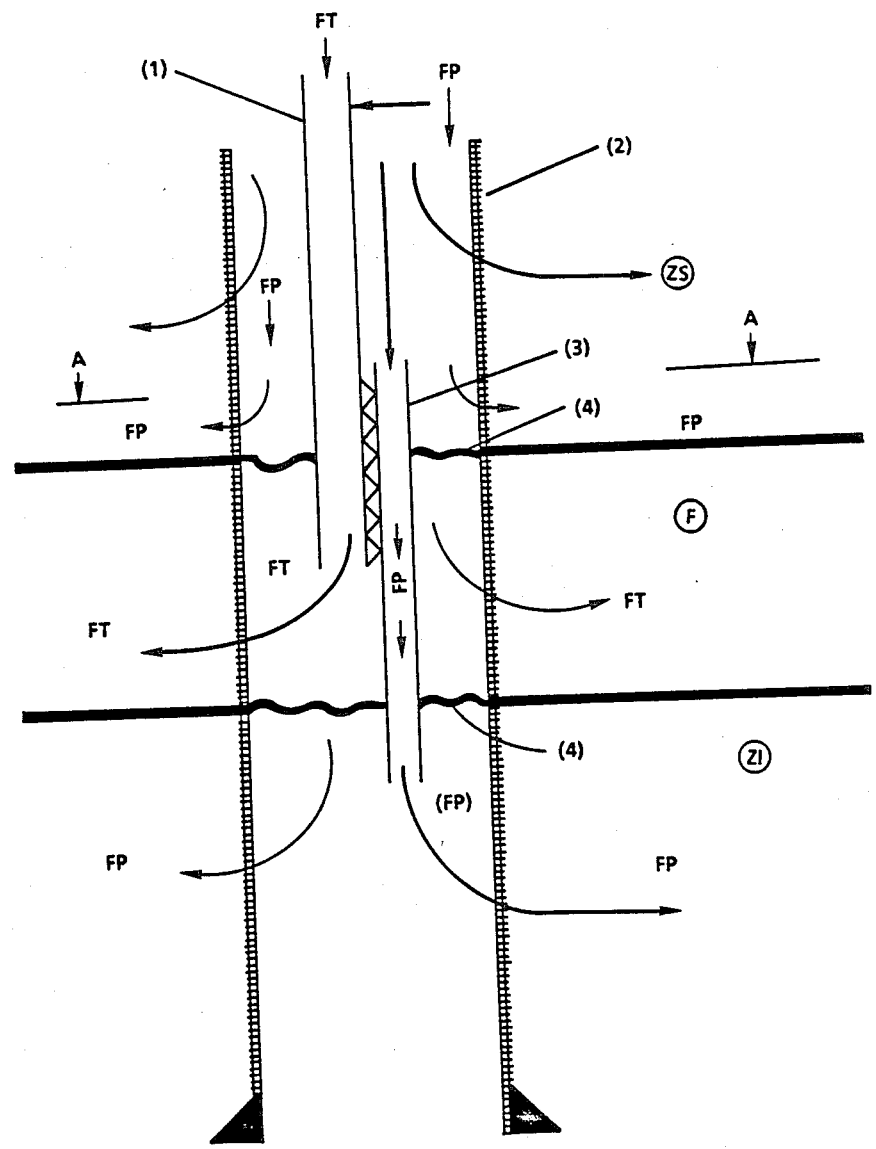
FIG. 1 illustrates one form of the present invention used in a wellbore.
Figure 3A:
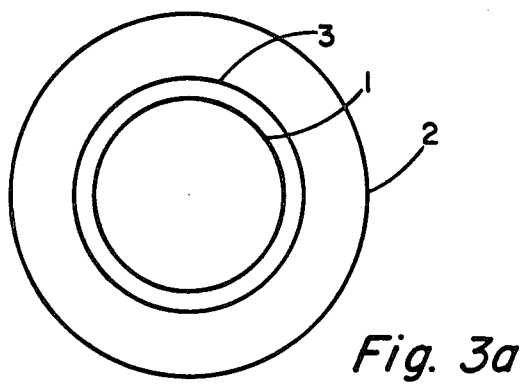
FIGS. 3A through 3C illustrate alternative means for transporting fluids through tubing in accordance with the present invention.
Figure 3B:
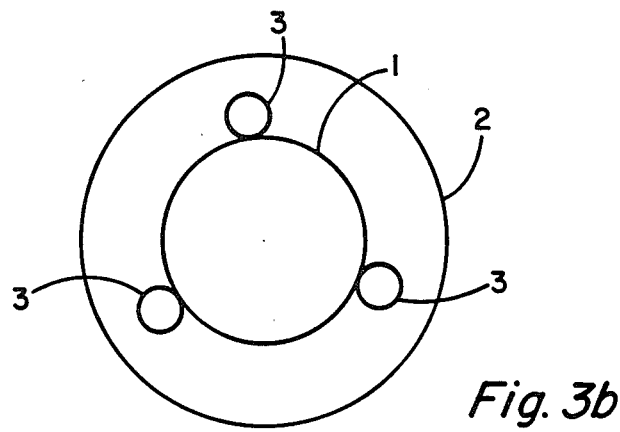
Figure 3C:
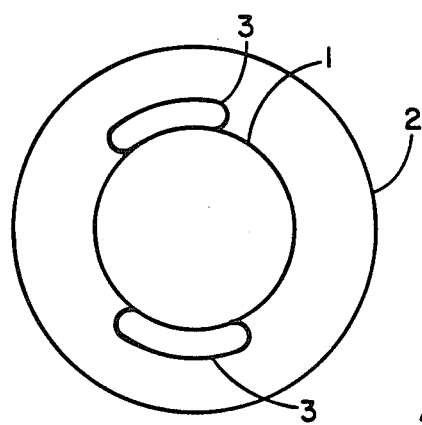

These variations, though not exhaustive, are shown in FIG. 3, which consists of FIGS. 3a, 3b and 3c which show a horizontal cross-section of the well seen from above at a level AA in accordance with FIG. 1. As in the other figures, the plugged annulus, perforations, etc. have not been sketched (these are obviously imaginable to one skilled in the art).

The invention will be better understood after a reading of the description which follows of two implementation variations on the invented process. The description should be read in conjunction with FIGS. 1 and 2, which show in diagram form the mechanical construction of these implementations and the fluid flows.

For reasons of clarity, large distortions of dimensions are used in these figures, the scale (ratio of actual distances to those used in diagrams) being much larger in the vertical plane than in the horizontal direction.

In the first variation, shown in FIG. 1, the treatment fluid (FT) is pumped from the surface into formation F through the coiled tubing 1, to which is attached a bypass line 3, linking the adjacent zones (above [ZS] and below [ZI]). The entire assembly is contained in the tube 2, which has been perforated in a known manner at suitable places to enable injection of fluids into the three relevant zones. The protection fluid (FP) is also pumped from the surface into the adjacent zones above (ZS) and below (ZI), through the casing 2 and tube 3. Obviously, tube 3 prevents the protection fluid invading the zone to be treated, and makes simultaneous injection into the two adjacent zones possible. Fluid pumping rates are strictly controlled and set at values calculated using known softwares which take all information on injection zones and fluid properties (viscosity, density, etc.) into account.

In the area of the treatment fluid/protection fluid interface 4, these fluids are not perfectly separated, particularly if they are partly miscible. However, since the interface stretches out horizontally over a distance much smaller than the thickness of the formation to be treated, this does not hinder process implementation.

Figure 2:
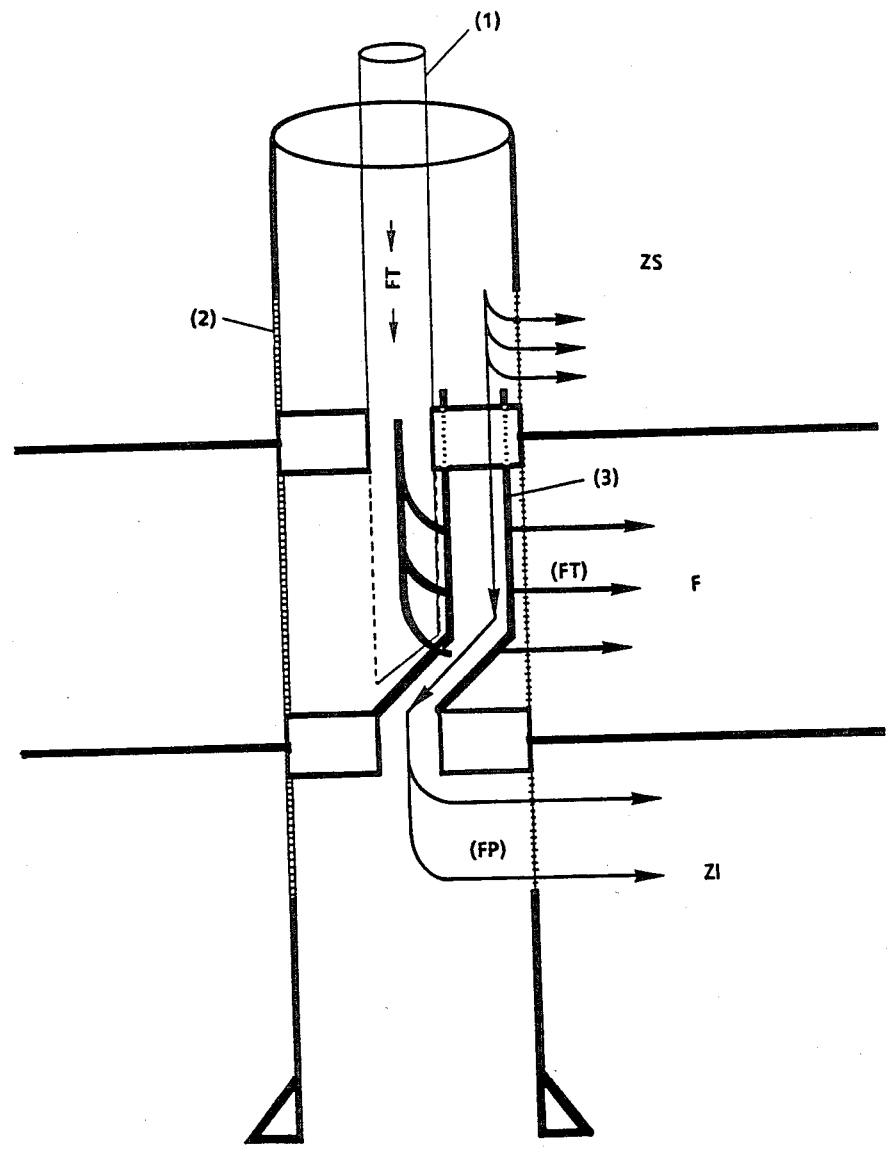
FIG. 2 illustrates an alternative method of treatment in accordance with the invention.

Using the second variation, shown in FIG. 2, the treatment fluid (FT) is pumped from the surface as above through the coiled tubing 1 inside the casing 2, and the protection fluid (FP) pumped through the casing itself. A two-piece packer (with upper and lower parts, "straddle packer"), with a tube 3 linking the two parts, isolates the formation to be treated, sealing it off inside the casing from the two adjacent zones.

This variation prevents any risk of treatment and protection fluids mixing. The first variation nevertheless has the advantage of being simpler.

Suitable treatment and protection fluids are selected depending on the type of treatment desired and the nature of the different zones. The information given below in the form of examples will guide those skilled in the art in their choice.

For temporary or permanent formation plugging, water can be chosen as the protection fluid. It can possibly be loaded with salts such as sodium chloride or ammonium chloride. For a treatment fluid, a water solution of a known plugging agent, for example a xanthan or more or less hydrolysed polyacrylamide or analogous solution, or a solution having delayed gelling or precipitation properties.

For matrix acidification, chosen protection fluids can be diesel oil or kerosene and the treatment fluid an acid aqueous solution containing, for example, 12% hydrochloric acid and 3% hydrofluoric acid (or 13.5%/1.5%; or 6%/1.5%).

As a variation of this, the protection fluids may be a high density aqueous solution (inert brine) or a diluted acid.

For a water cone blockage treatment, protection fluids can be diesel oil or kerosene and the treatment fluid a plugging fluid of the above type.

The invention may also be applied to two specific instances which are much more delicate: gravel pack and/or fracture situations.

It is known that a gravel pack consists of a specific material of appropriate grain size packed against the drilling well wall and held in place by a screen consisting of a thin metallic sheet (often of stainless steel) with slots or analogous orifices cut in it.

The object of this assembly is to prevent sand present in certain subterranean layers from invading the well, while letting fluids through.

The choice of the specific material, its grain size, and material and screen installation techniques are well known to those skilled in the art.

It should be pointed out that the screen is by nature very fragile and when a gravel pack is used, it is unthinkable to install a packer (expanding plug device which applies much pressure to the well walls). Such a packer would crush the screen and destroy the gravel pack.

Fractures and the problems they present, whether natural or not, are also well-known.

In some cases, these fractures may occur in combination with extremely high permeability zones ("thief zones") which open a preferential course for fluids, thus leading to loss of useful fluid.

In the same manner, if the well annulus is badly cemented, vertical channels in the annulus can connect zones, again leading to fluid loss.

Figure 4:
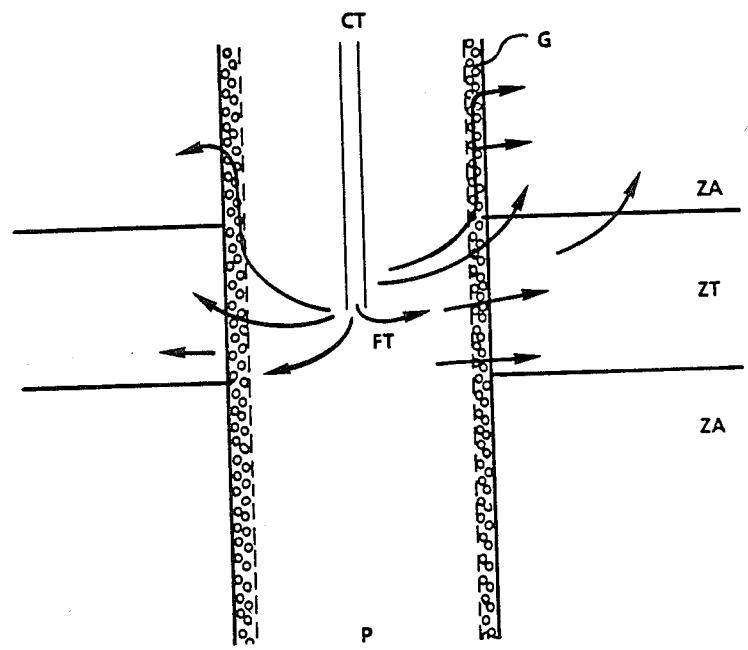
FIGS. 4 and 5 illustrate treatment processes over which the present invention constitutes an improvement.

The invention enables selective treatment of zones even in the particularly delicate instances mentioned above (whether singly or several simultaneously), as is shown in FIGS. 4 to 8 annexed:

FIG. 4 shows a well (P) with a gravel pack (G) in operation. It can be seen that, if treatment fluid (FT) is injected into the treatment zone (ZT) through coil tubing (CT), it will disperse towards the adjacent zone (ZA) and be at least partially lost.

Figure 5:
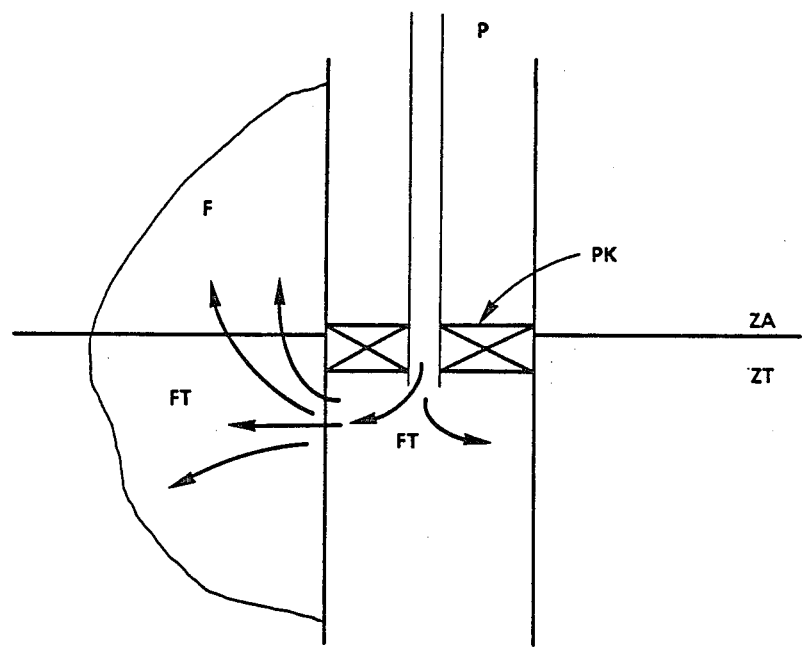

FIG. 5 shows a well and a fractured formation (F). It can be seen that, if an attempt is made to treat the zone to be treated by isolation using a packer (PK) in the classic manner, the treatment fluid will be unavoidably lost into the fracture towards the adjacent zone for which no treatment is planned. NOTE: In FIGS. 4 to 8, references have the same meanings.

Figure 6:
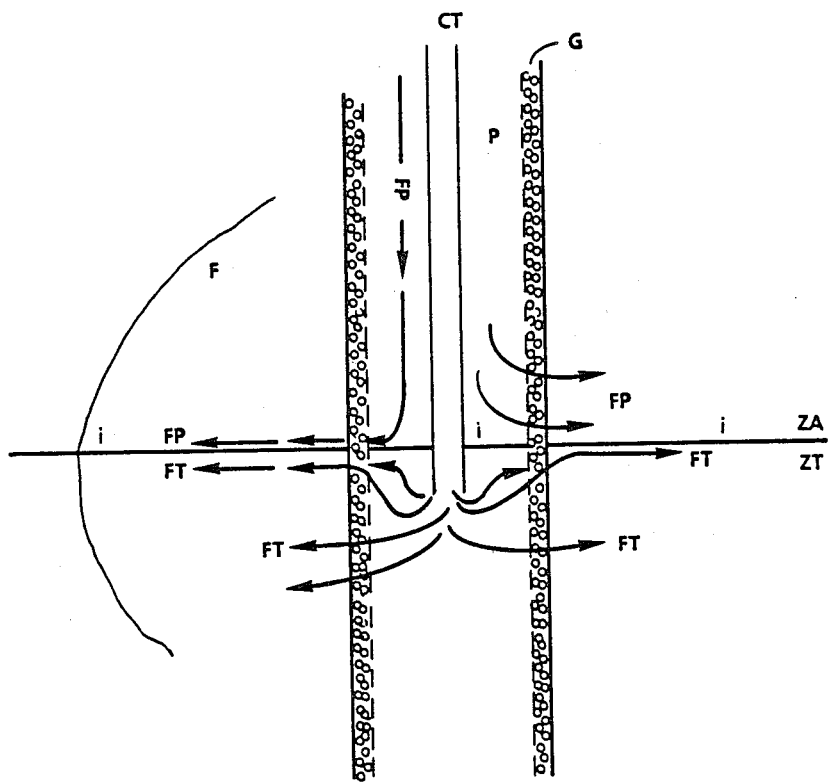
FIGS. 6 and 7 illustrate alternative processes in accordance with the invention and FIGS. 8A and 8C illustrate comparatively with FIGS. 8B and 8D, respectively, the advantages of the method of the present invention (FIGS. 8A and 8C) with processes not utilizing the present invention (FIGS. 8B and 8D).

FIG. 6 shows an implementation of the invention when a gravel pack application is used. The desired treatment fluid is injected through the coil tubing or production tubing and is prevented from escaping towards the adjacent zone by simultaneously injecting a protection fluid FP into the well. Fluids FT and FP must be non-miscible or only slightly miscible, and respectively compatible with zones ZT and ZA. Through correct placing of the output aperture of tube CT (or the production tube), coincidence can be achieved between interface i (of fluids FP and FT) and the interface of zones ZT and ZA. This, of course, remains valid when a fracture is present. Such an instance, which is more delicate, is partially shown in FIG. 8. The interface i will develop along preferred paths (those paths and channels of highest permeability), which is precisely the objective sought.

Figure 7:
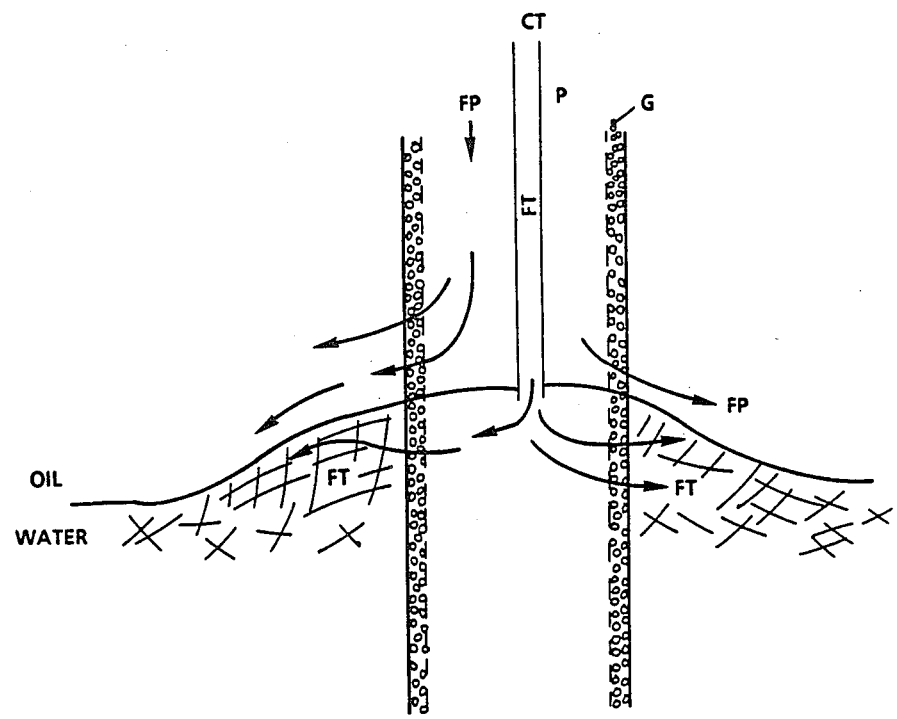

FIG. 7 shows use of the invention in treatment of a water cone in the presence of gravel packing.

FIG. 8 shows treatment of a very delicate instance of water channeling in a fractured injection well with a thief zone (TZ) (extremely high permeability zone).

Figure 8A:
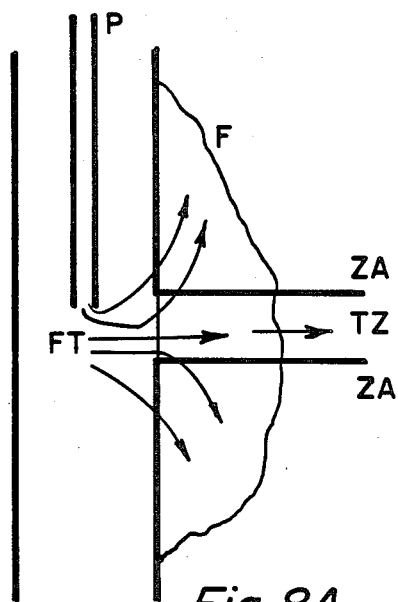
Figure 8B:
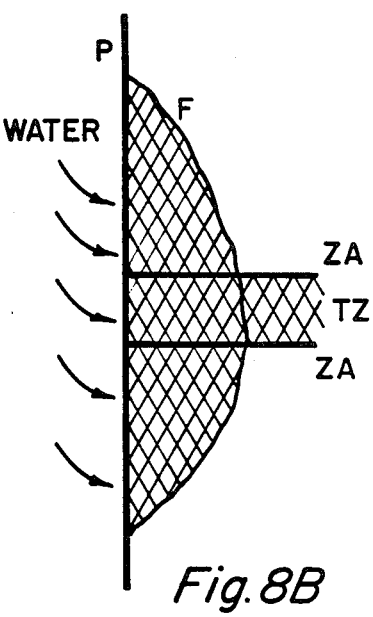

FIG. 8a shows a classic treatment and 8b its result: total plugging, which is the opposite of the desired result.

Figure 8C:
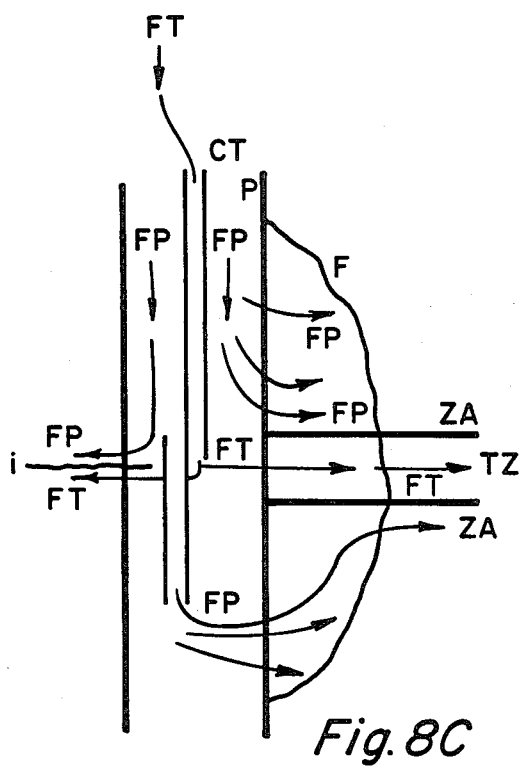
Figure 8D:
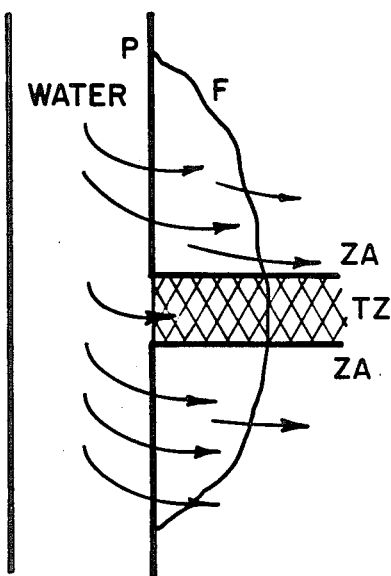

FIG. 8c shows treatment using the invention and 8d its result: the loss zone is correctly plugged by the treating agent and water sweeping can be carried out in the adjacent zones.

It should be noted that a gravel pack has not been shown in FIG. 8 for simplicity's sake, but one may be present, as mentioned above.

It can be seen that FIGS. 8c and d use a tube with a bypass line as described above.

The invention also enables situations similar to water cones, i.e. when the entire water-bearing nappe rises towards the perforations, to be treated. In such cases, also, treatment can easily be carried out even in a gravel pack situation.

Figure 9:
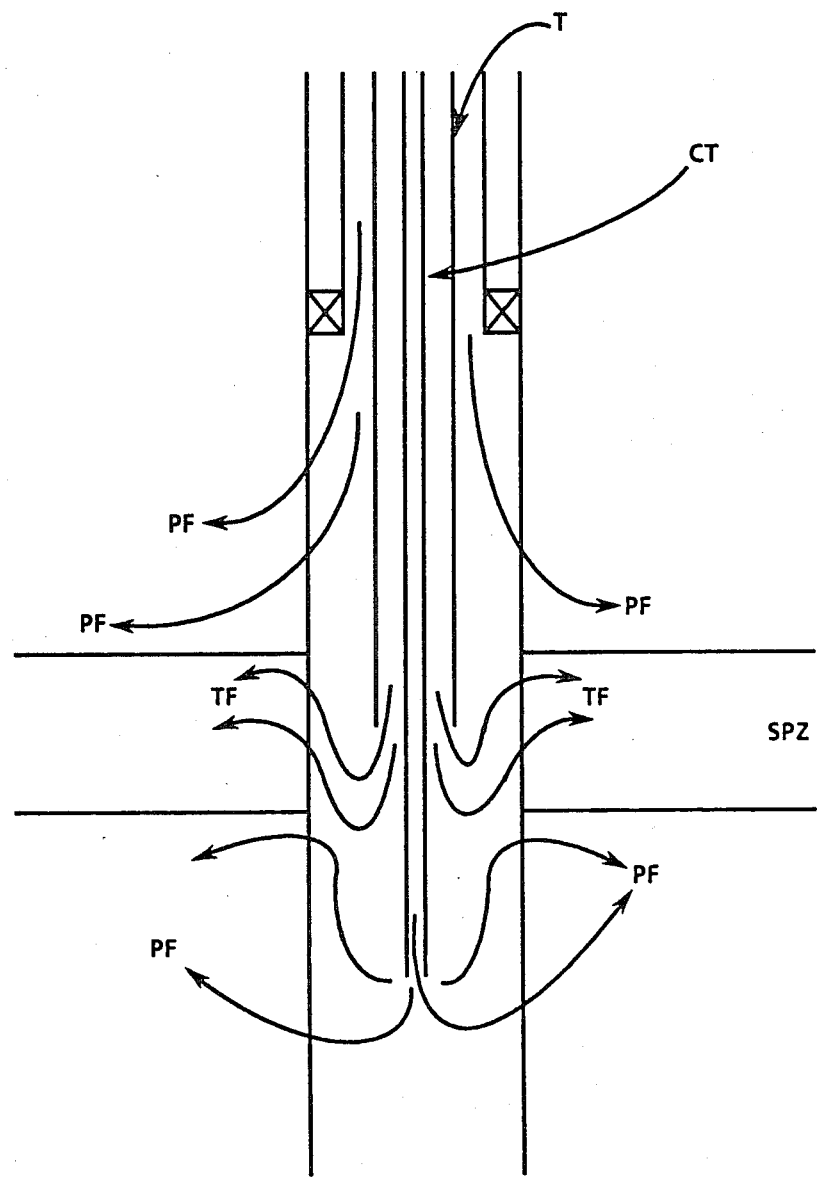

FIG. 9 shows another variation of the invention.
T designates the tubing
CT the coil tubing
PF the protection fluid
TF the treatment fluid
SP2 the zone to selectively plug (or treat).

It can be seen that the protection fluid is pumped into the well and into the coil tubing CT. The treatment fluid is pumped into the annular space defined by the tubing T and the coil tubing CT.

Very high precision of treatment fluid positioning is thus obtained.

The various treatment and protection fluids can be chosen by one skilled in the art, on the one hand as a result of his own basic knowledge and, on the other, after a reading of what precedes and French patent application Nos. 86-14089 of 8th Oct. 86 (delayed precipitation system), 86-06434 of 30th April 86 (delayed precipitation system), 86-16528 of 25th Nov. 86 (composition for permanent plugging and solid for controlled plugging) and 85-10272 of 2nd July 1985.

In some instances, a cement slurry could also be used as treatment fluid, as is well-known.

Indication of all the patent applications quoted above is given for reference and it is therefore unnecessary here to quote details of the fluids to be used.

Obvious details concerning the bore, casing strings, perforations, etc. have not been shown, for the sake of simplicity.

We claim:

1. Process for selectively treating a subterranean formation without affecting adjacent zones above and below the formation characterized by:
    injecting a treatment fluid into a wellbore annulus adjacent the formation to be treated and
    simultaneously injecting two protection fluids, immiscible with said treatment fluid, into said annulus adjacent said zones
    wherein said treatment fluid and protection fluids are separated within said wellbore annulus solely by a fluid interface between said treatment fluid and each of said immiscible protection fluids.

2. Process in accordance with claim 1, characterized in that the protection fluids are selected from a group consisting of water, a high density aqueous solution of inert salts and dilute acid.

3. Process in accordance with claim 1, characterized in that the protection fluids consist of hydrocarbons selected from gas oil, diesel oil and kerosene.

4. Process in accordance with claim 1, characterized in that the two protection fluids are identical.

5. Process in accordance with claim 1, characterized in that the treatment fluid comprises a plugging agent selected from a xanthan, hydrolyzed polyacrylamide, a delayed gelling, and a delayed precipitating solution.

6. Process in accordance with claim 1 characterized in that the treatment fluid comprises an aqueous acid solution.

7. Process in accordance with claim 1, characterized in using a device lowered inside a well casing which consists of a treatment fluid injection tube and at least one counterpart bypass line stretching at least from top to bottom of the formation to be treated, the bypass line linking, within the casing, the adjacent zones above (ZS) and below (ZI), whereby protection fluid flow is possible from the upper zone to the lower zone without affecting the formation to be treated between these two zones.

8. Process in accordance with claim 7, characterized in that treatment fluid is injected through coil tubing having an outlet aperture level with the formation to be treated and protection fluid is injected through the well casing.

9. Process in accordance with claim 7, characterized in that the bypass line comprises of at least one tube attached to the coil tubing and being of circular cross-section.

10. Process in accordance with claim 7 wherein the bypass line comprises at least one tube attached to the coil tubing and being of kidney-shaped cross section.

11. Process in accordance with claim 7 wherein the bypass line comprises a tube concentric with the coil tubing.

* * * * *